Figure 1:
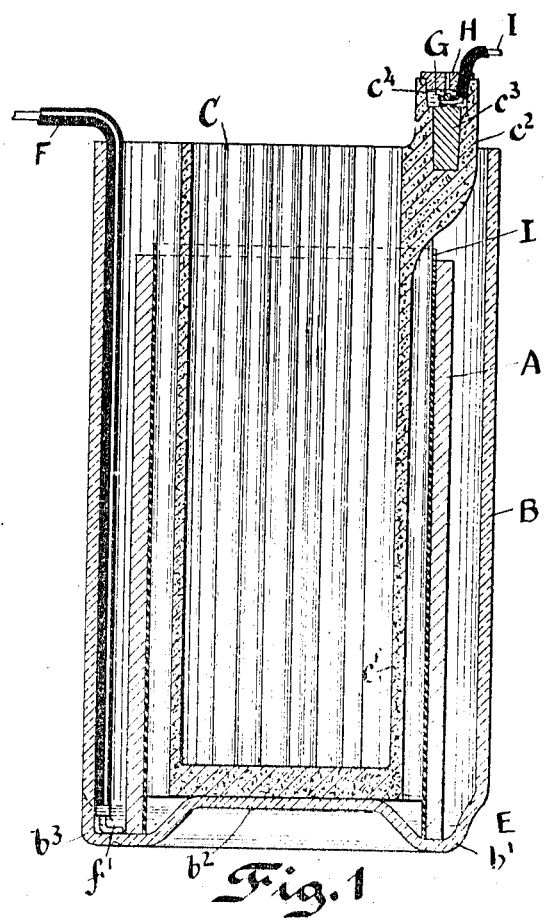

J. H. GUGLER.
ELECTRIC BATTERY CELL.
APPLICATION FILED MAY 3, 1909.

1,055,165. Patented Mar. 4, 1913.
4 SHEETS—SHEET 1.

Witnesses
A. J. Andrews
Minnie D. Schunbein

Julius H. Gugler, Inventor
By Lengel Lemore Lolle, Attorney

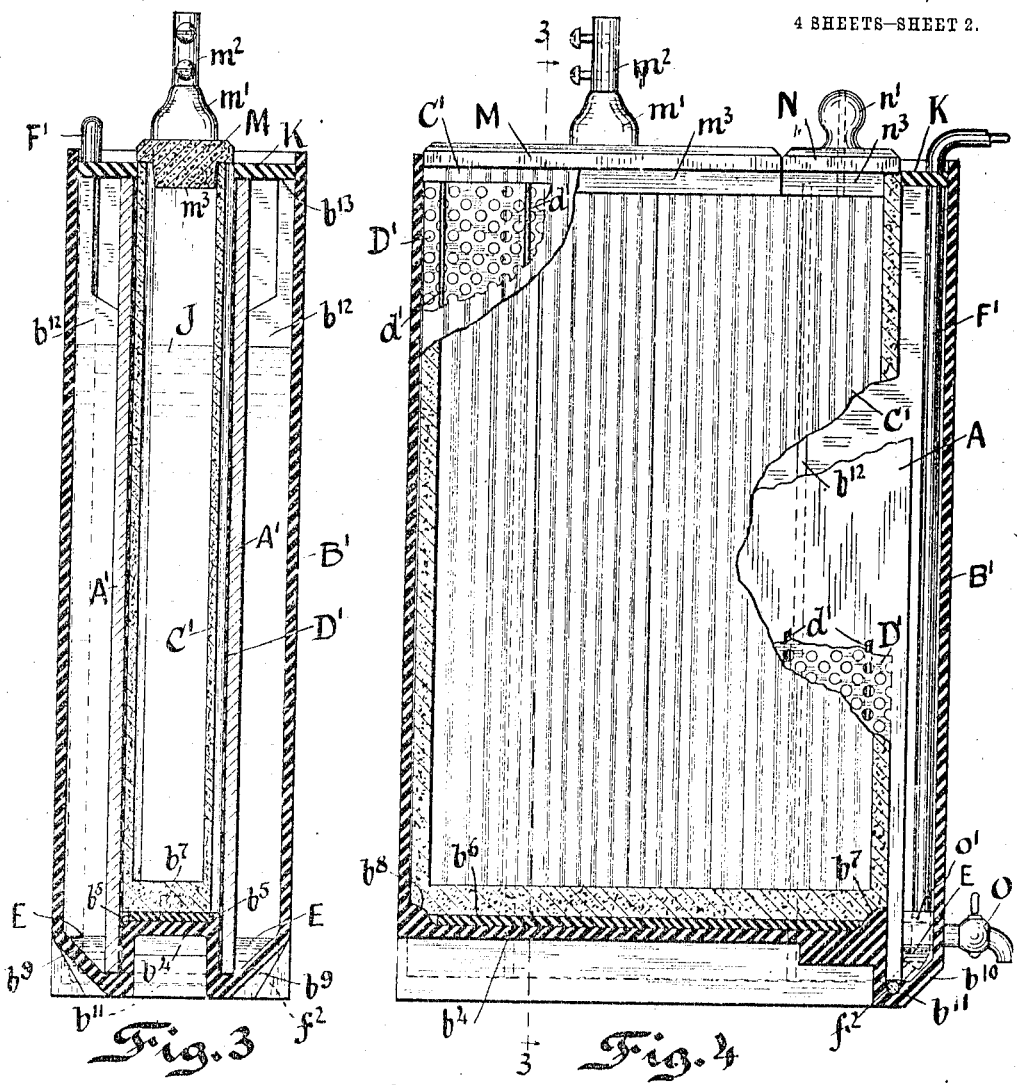

J. H. GUGLER.
ELECTRIC BATTERY CELL.
APPLICATION FILED MAY 3, 1909.

1,055,165.

Patented Mar. 4, 1913.

4 SHEETS—SHEET 3.

Witnesses
A. J. Andrews
Minnie D. Schienbein

Julius H. Gugler,
Inventor

By George Wetmore Colles
Attorney

UNITED STATES PATENT OFFICE.

JULIUS H. GUGLER, OF MINNEAPOLIS, MINNESOTA.

ELECTRIC-BATTERY CELL.

1,055,165.  Specification of Letters Patent.  Patented Mar. 4, 1913.

Application filed May 3, 1909. Serial No. 493,465.

*To all whom it may concern:*

Be it known that I, JULIUS H. GUGLER, of Minneapolis, Minnesota, have invented an Electric-Battery Cell, of which the following is a specification.

My invention relates to electric primary batteries and has for its object to provide an improved cell that will facilitate the convenient application and insure the most complete consumption of the active element in a primary cell, and it is particularly useful in connection with the invention described in my U. S. Patent No. 938,663, issued November 2, 1909. To this end I provide a battery jar with its bottom or resting point for active elements arranged in the shape of a V or trough with sides and ends that extend to the wall of the jar outwardly and to a crown for the negative element toward the center of the jar. The arrangement may be such that one or any number of multiple plates may be set in the jar and find their proper place by sliding by their own weight to the proper position and making electrical connection with one or more common leads. The arrangement is such that it will cause any small or irregular piece of the active element which may be put in the cell to slide into proper position for useful work and make a good electrical contact. Any fragments of the active element that may fall from the main body as it becomes disintegrated will likewise be utilized. I also provide in my improved cell means for insuring a good electrical connection from a multiple set of plates to a lead common to all plates. In cases where a multiple-element cell is used, I further provide a transverse trough or gutter at one side of the cell uniting the several troughs corresponding to the several anodes, and forming a low-resistance connecting-means for the circuit-lead. In addition, I also provide a groove at the bottom of said transverse trough or gutter of such size as to fit the wire circuit-lead which is laid therein, so that said circuit-lead lies at the very bottom of the trough, and it is held in this position positively by engagement of the projecting ends of the anodes, thus insuring at all times perfect electrical contact between the latter and said lead. The other features of my invention are the provision of internal ribs on the sides of the jar which act to support the anode-plates and hold them in close relation to the cathode; the special structure and formation of the cover-plate; and certain projecting lugs whereby the cathode is maintained in position against lateral displacement.

Figure 2:
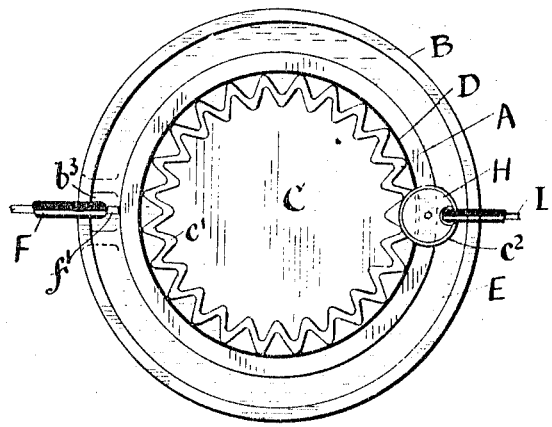
Figure 6:
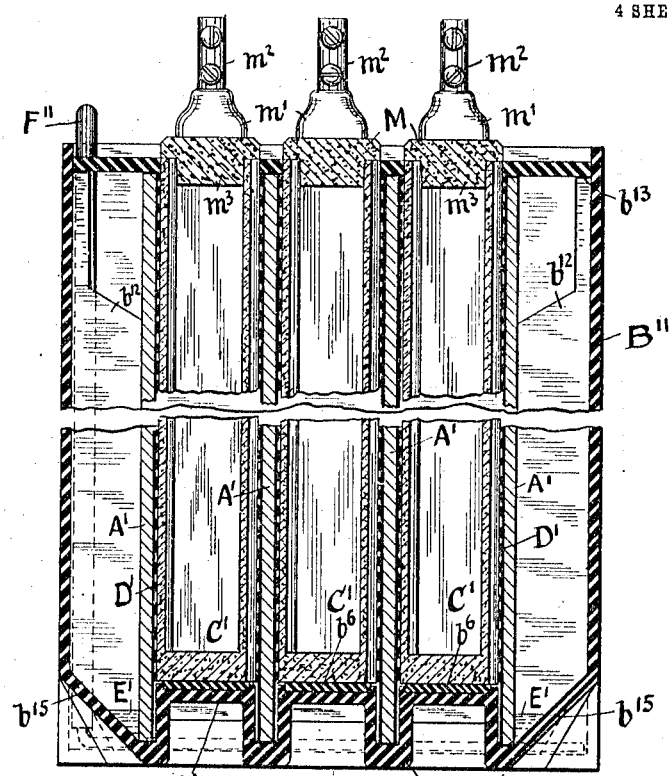
Figure 7:
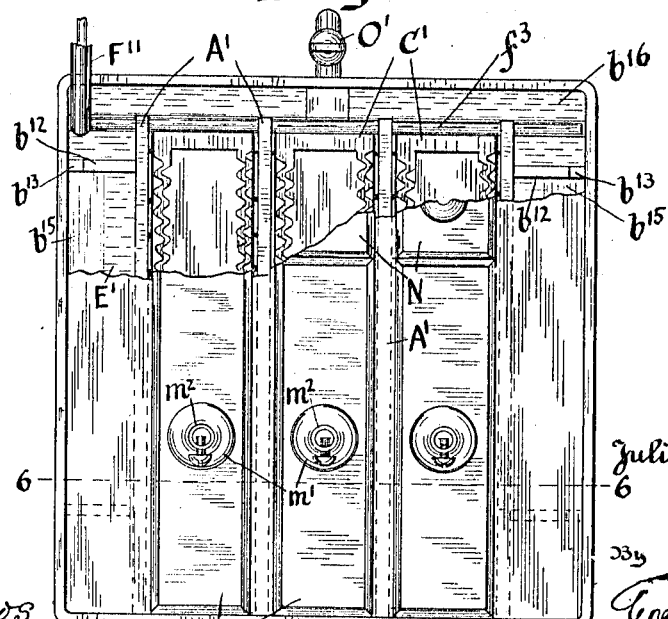
Figure 8:
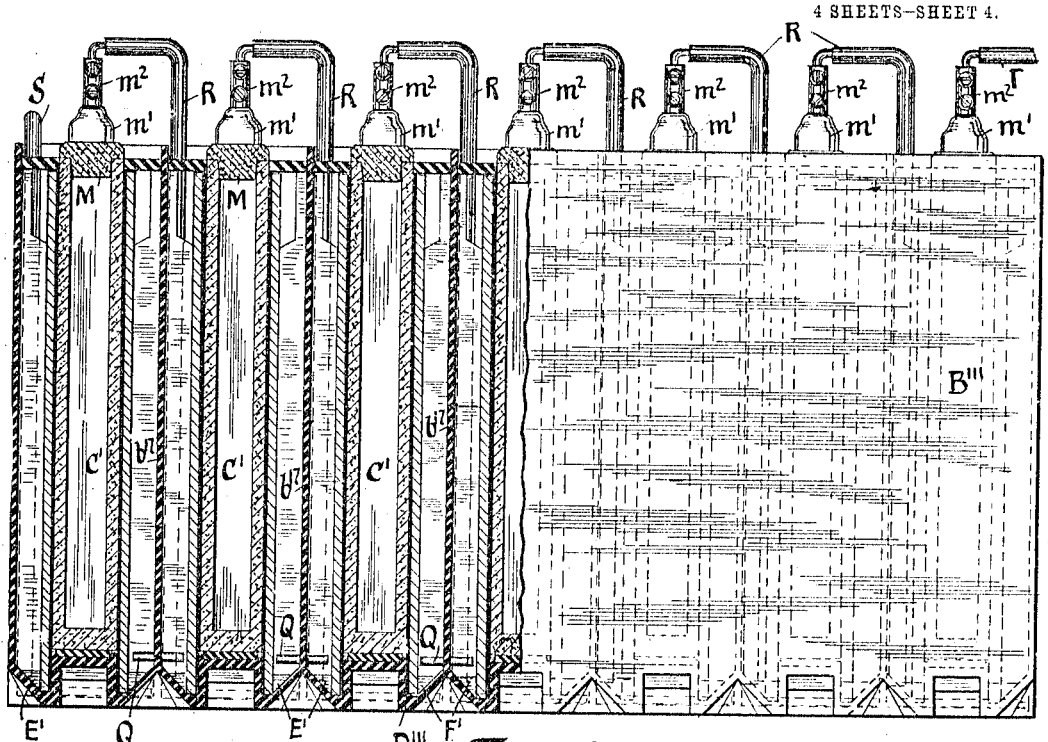
Figure 9:
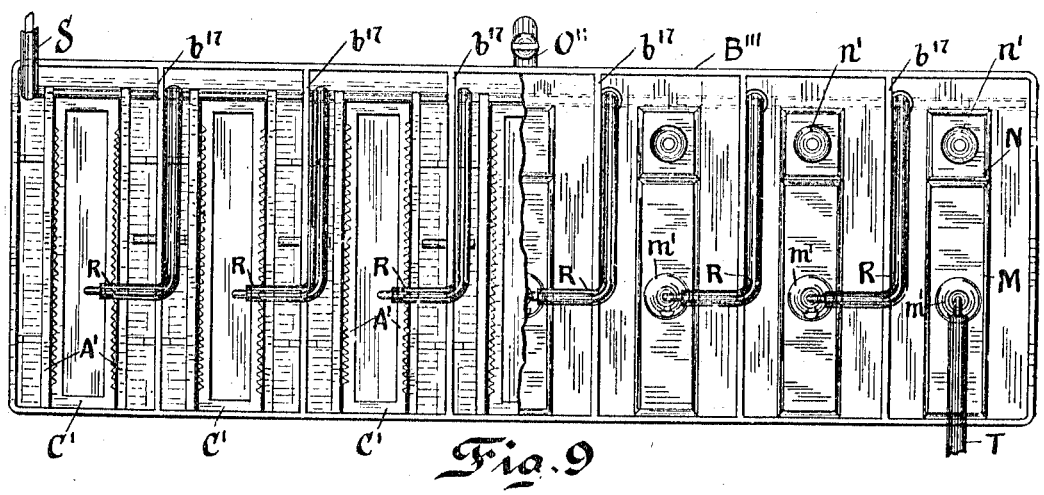

My improved cell is adapted to be made in the form of either a single concentric cell, a single flat cell, a multiple-electrode cell, or a multiple-series cell, and these several forms are illustrated in the accompanying drawings, wherein, Figures 1 and 2 are respectively a longitudinal section and a plan through the concentric form; Figs. 3, 4 and 5 are respectively a transverse section on the plane 3 of Fig. 4, a longitudinal section on the plane 4 of Fig. 5, and a plan view, of the flat form of cell, parts being broken away in Figs. 4 and 5; Fig. 4ª is a longitudinal section on the plane 4ª of Fig. 5 on a larger scale of the right-hand lower corner of this form of cell, to illustrate the manner of holding the wire circuit-lead in position; Figs. 6 and 7 are respectively a transverse section and a plan through the multiple-electrode form of cell, parts being broken away; Fig. 8 is a side elevation, partly in longitudinal section, of a multiple-series cell; and Fig. 9 is a plan view thereof with a part of the cover broken away.

In these drawings the same part is designated by the same reference letter or numeral in each figure.

Referring first to Figs. 1 and 2, B designates the jar or container, A designates the anode, and C the cathode, said elements being contained one within the other as shown. The anode A is made in the form of a hollow cylinder open at both ends and rests in an annular trough $b'$ formed at the bottom of the jar B by providing a raised center $b^2$, this latter forming a platform or rest for the cathode C, which is here shown in the form of a cup having corrugated or ribbed sides $c'$. The anode is made to approach the cathode very closely and is separated therefrom by a perforated cylindrical plate D of insulating material. Within the cathode-cup C is contained a depolarizing solution (not shown), for the action of which the corrugated walls of the cup form a very large amount of active surface. Within the annular trough $b'$ is placed a quantity of mercury E, in which the lower end of the anode rests and which serves to keep it constantly amalgamated, provided it is zinc, as is ordinarily the case, and furthermore to form a thorough and perfect electrical contact with the circuit-lead F, the lower end of which dips into the mercury as shown at $f'$. A somewhat similar arrangement of elements is shown in the invention described in my U. S. Patent No. 938,663, issued November 2, 1909; but the important novel feature here shown is the arrangement of the trough $b'$ whereby a minimum quantity of mercury is made to serve the purpose and keep all of the zinc constantly amalgamated as well as to maintain a good electrical contact with fragments of zinc which may fall down from the main body as the plate becomes decomposed and thus utilize said fragments which would otherwise be wasted. This is accomplished by giving the trough $b'$ a V-shaped form, the sides being made to converge toward the bottom at a steep angle, said angle being in excess of the angle of repose of the zinc thereon, which is necessarily a high angle when the zinc is immersed in liquid owing to the buoying effect of the latter. At one point of the circumference of the trough a rectangular recess $b^3$ is formed therein to accommodate the end $f'$ of the wire F. The cathode, which is here supposed to be of porous carbon, is here shown as provided with a terminal post $c^2$ in which is sunk a metal plug $c^3$ at the bottom of a well $c^4$ containing oil G, the latter being covered by a cover-cap H through one side of which passes a circuit-lead I which is connected to the plug $c^3$ in any suitable manner; said connector-device does not however constitute a part of my present invention, as it is fully described and claimed in my copending United States application No. 473,637, filed January 22, 1909.

In Figs. 3, 4 and 5 is shown a flat battery-cell comprising a rectangular jar B', a rectangular cup-shaped cathode C' mounted in the center thereof upon a raised platform $b^4$, and a pair of anode plates A' flanking the cathode and separated therefrom by perforated separating-plates D'. The side-walls of the cathode-element as shown are made thin and corrugated as in Fig. 1 to present a large amount of active surface for the action of the depolarizing solution or liquid J which in the operation of the battery is contained within the cathode cup. The separating-plates D' are formed with a plurality of ribs $d'$ of small thickness on the anode-side the use of which is advisable to prevent any fragments of the anode from coming in contact with the cathode through holes in the separating-plate. The raised platform $b^4$ is formed with small raised beads $b^5$ on its side-edges to hold in place a soft-rubber cushion $b^6$ which is preferably placed between the jar and the cathode to prevent small pieces of the latter from being chipped off. Further, lugs $b^7$, $b^8$ are formed on the ends of the platform $b^4$ and fit in corresponding recesses in the bottom-edges of the cathode, as shown, to hold the latter in place. At the sides of the platform $b^4$ are V-shaped troughs $b^9$ containing mercury E, into which the bottom edges of the anode plates dip as in the first form described. These troughs are connected at one end by a transverse trough $b^{10}$ which has a groove $b''$ at the bottom slightly below the level of the bottoms of the troughs $b^9$, to receive the end $f^2$ of the circuit-lead F'. This lead as shown extends down the wall of the cell at one corner and the end $f^2$ is bent at right angles so as to run along horizontally in groove $b''$, the bottom edges of the anode-plates extending over it and holding it in place, as clearly shown in Figs. 4, 4ª and 5. The mercury E of course fills the trough $b^{10}$ as well as the trough $b^9$, and the wire $f^2$ being at the bottom thereof cannot possibly rise above the mercury-level, however little there may be in the trough. Besides, the groove $b''$ is slightly shallower than the diameter of the wire $f'$, so that the latter projects slightly above it and causes the projecting edges of the anodes to rest thereon, forming direct metallic contact and/positively maintaining the wire at the bottom of the groove, all as clearly shown in Fig. 4ª. Thus a firm, constant and low-resistance connection is provided between the lead and anodes. The anodes are held in place against the sides of the cathode by means of upright ribs $b^{12}$ formed on the inner sides of the jar. These ribs are extended to near the top of the jar, their upper ends $b^{13}$ forming resting surfaces for the cover-plate K which is cut out centrally as shown to allow the upper end of the cathode to pass through; this latter having separate covers M, N of its own, on one of which is mounted the terminal post $m'$ provided with a terminal connector $m^2$, while the other is provided with a handle $n'$ to enable it to be readily manipulated. These cover-plates have wedge-shaped lugs $m^3$, $n^3$ which project into the upper end of the cathode and by wedging between them form a tight cylindrical connection. The object in having two cover-plates is to enable the interior of the cathode to be inspected and refilled with depolarizer from time to time, which is done by removing the small plate N without disturbing the circuit-connection. Near the bottom and just above the mercury in the trough $b^{10}$ is formed a lug $o'$ for the attachment of a draw-off cock O whereby the battery-liquid can be readily drawn off when exhausted.

In Figs. 6 and 7 is shown a cell having a multiple disposition of elements arranged in the same manner as in Figs. 3, 4 and 5. As the elements A', C' and separating-plates D' are the same, they are designated by the same reference-letters. The jar B'' is of special form, provided at its center with a series of raised platforms $b^4$ disposed in parallel relation and separated by the narrow mercury troughs $b^{14}$ just wide enough to receive the edges of the anode and separating-plates. These are all connected together and with the V-shaped troughs $b^{15}$ at the sides by the transverse end-trough $b^{16}$ corresponding to the transverse trough $b^{10}$ in Figs. 3, 4 and 5 and having the end $f^3$ of the circuit-lead F'' disposed at the bottom thereof as previously. A draw-off cock O' disposed in similar relation to the cock O is also provided.

In Figs. 8 and 9 is shown a multiple cell constructed on the same principles, the same constituting in effect a plurality of the cells shown in Figs. 3, 4 and 5 disposed side by side and having all the jars B' combined into a single jar B''', but the cell-spaces are connected together for convenience of emptying the cells by tubular passageways Q passing through the intercell walls $b^{17}$ and being as long and as small in diameter as possible so as to minimize leakage of current, while enabling the liquid in all the cells to be drawn off at once through a draw-off cock O''. The cells are connected together in series by connecting-leads R extending from the terminal posts $m'$ of the carbon on one cell to the mercury-bath of the next cell as shown, S and T designating the circuit-leads, which are connected respectively to the last carbon and zinc of the respective end-cells.

From the above description it will be readily seen that my invention may assume a variety of forms all embodying the same principles, and that a great number of changes and modifications are possible in the nonessentials without departing from the spirit of my invention, the scope of which is particularly defined in my claims.

Having thus described my invention, what I claim as new and desire to secure by Letters Patent is:

1. A battery-cell comprising, in combination, a jar or container having a raised platform in the base thereof and a trough disposed below and at the side of said platform, a cathode supported on said platform, a quantity of mercury in said trough, an anode at the side of said cathode and dipping into said mercury, and a perforated separating-plate disposed between said anode and cathode.

2. A battery-cell comprising, in combination, a jar or container, a cup-shaped cathode disposed midway between the sides thereof, a pair of separating-plates on the sides of said cathode, a pair of anode-plates disposed on the outer sides of said separating-plates, vertical ribs projecting from the inner wall of said container and abutting against the outer sides of said anode-plates so as to hold them against said separating-plates and the latter against said cathode, the upper ends of said ribs terminating below the upper edge of said cathode, and a cover-plate resting on the upper ends of said ribs and cut away in the center to allow the cathode to pass through the same.

3. A battery-cell comprising, in combination, a jar or container having a trough at each side thereof, a cathode, mercury in said troughs, anode-plates flanking said cathode and dipping into said mercury, a transverse trough connecting said troughs and in which the mercury also is contained, and a circuit-lead dipping into the mercury and having its end disposed longitudinally along the bottom of said last-named trough.

4. A battery-cell comprising, in combination, a jar or container having a trough at each side thereof, a cathode, mercury in said troughs, anode-plates flanking said cathode and dipping into said mercury, a transverse trough connecting said troughs and in which the mercury also is contained, said last-named trough having also a longitudinal groove or depression at the bottom thereof extending below the bottoms of the other troughs, and a circuit-lead dipping into said mercury and having its end disposed longitudinally of said trough and lying in said groove.

5. A battery-cell comprising, in combination, a jar or container having a trough at each side thereof, a cathode, mercury in said troughs, anode-plates flanking said cavity and dipping into said mercury, a transverse trough connecting said troughs and in which the mercury also is contained, said last-named trough having also a longitudinal groove or depression at the bottom thereof extending below the limits of the said troughs, and a circuit-lead dipping into said mercury and having its end disposed longitudinally of said trough and lying in said groove, the edges of said anode-plates overlying said circuit-lead and holding the same in place.

6. A battery-jar formed with a raised platform in the bottom thereof flanked by troughs at opposite sides thereof, and a transverse trough connecting said first-named troughs, and having a groove in the bottom thereof extending below the bottom of said first-named troughs.

7. In combination, a battery-jar having a mercury-trough at the bottom, and a groove adapted to admit a wire-lead passing across said trough and cutting the bottom thereof; a metallic circuit-lead lying in said groove, a portion of which projects above the bottom of said trough, an anode resting in said trough and upon said lead; and a quantity of mercury in said trough.

8. A battery-jar having two or more parallel troughs in the bottom thereof, and a transverse trough connecting all the other troughs; there being also a groove along the bottom of said transverse trough and lying below the bottoms of the other troughs.

9. In combination, a battery-jar having a plurality of parallel V-shaped troughs in the bottom thereof, a transverse trough crossing the ends of said first-named troughs, and a groove in the bottom of said last-named trough below the level of the bottoms of said first-named troughs; a wire lead lying in said groove, and a plurality of metal plates resting in said first-named troughs and overlying said wire-lead and resting upon the latter so as to hold it in position.

10. In a battery cell, the combination of a cathode, an anode, an electrolyte, a quantity of mercury, a container in which all of said elements are disposed, and an electrical conductor independent of said anode leading out of the cell and electrically connected with said mercury; said mercury lying at the bottom of said container and said anode and cathode being immersed in the electrolyte, the bottom of said container sloping at all points not covered by the cathode at an angle steeper than the angle of repose of the anode material in the electrolyte to the level of the mercury and thereby forming a receptacle with converging sides adapted to receive fragments of the anode, and also dipping in the mercury; whereby any loose anode material placed in the cell or falling from said anode is caused to slide until it makes electrical contact with said mercury.

11. The combination of a battery-jar formed with two or more parallel troughs and a transverse trough connecting them, anode members disposed in the respective parallel troughs, a quantity of mercury in said troughs electrically connecting said anode members, and an electric conductor dipping in said transverse trough.

12. The combination of a battery-jar formed with a plurality of parallel troughs in the bottom thereof and a transverse trough connecting said first-named troughs and having a groove extending along the bottom thereof, an electrical conductor disposed in said groove, a plurality of anode members resting in said troughs, and a quantity of mercury disposed in said troughs and connecting all of said anode members with said conductor.

13. The combination of a battery-jar having a plurality of parallel disposed anode-members and a transverse groove in its bottom below said anode-members, and a metallic circuit lead lying in said groove and projecting above the top thereof whereby said anode members rest permanently in contact therewith.

14. The combination of a battery-jar having in its bottom a plurality of parallel troughs and a transverse trough connecting them, a quantity of mercury contained in said troughs, a metallic circuit lead lying along the bottom of said transverse trough, and a plurality of anode members resting in said parallel troughs and having their ends extending into said transverse trough and resting upon said circuit-lead.

15. In a battery-cell, the combination of a container having a mercury-sump in the bottom with diverging sides sloping at an angle in excess of the angle of repose of the anode material in the electrolyte whereby loose fragments of anode material are guided by striking said sloping sides to the bottom, a quantity of mercury in said sump, an anode resting in said mercury and an electric conductor dipping into said mercury and adapted to convey the current generated by the cell.

16. In a battery-cell, the combination of a container having a mercury-sump in the bottom with diverging sides sloping at an angle in excess of the angle of repose of the anode material in the electrolyte whereby loose fragments of anode material are guided by striking said sloping sides to the bottom, there being immediately over the aforesaid sloping bottom parallel walls between which the anode is adapted to be contained and one of which separates the anode from the cathode, said parallel walls together with said sump forming the anode compartment whereby the anode material cannot reach the cathode, an anode in said compartment resting on the bottom thereof and dipping in said sump, a quantity of mercury in said sump, and an electric conductor dipping in said mercury and adapted to convey the current generated by the cell.

In witness whereof I have hereunto set my hand this 30th day of April, 1909.

JULIUS H. GUGLER.

Witnesses:
GEORGE W. COLLES,
WILHELMINA D. SCHIENBEIN.